United States Patent [19]

Frattarola

[11] Patent Number: 5,382,124
[45] Date of Patent: Jan. 17, 1995

[54] FULLY RETRACTABLE CAPTIVE SCREW

[75] Inventor: Albert J. Frattarola, Swarthmore, Pa.

[73] Assignee: Southco, Inc., Concordville, Pa.

[21] Appl. No.: 192,855

[22] Filed: Feb. 7, 1994

[51] Int. Cl.[6] .................. F16B 21/18; F16B 39/00
[52] U.S. Cl. ...................... 411/352; 411/107; 411/970; 411/999
[58] Field of Search ............. 411/107, 108, 109, 103, 411/352, 353, 970, 999, 552

[56] References Cited

U.S. PATENT DOCUMENTS

| | | | |
|---|---|---|---|
| 3,465,803 | 9/1969 | Ernest et al. | 411/999 X |
| 3,564,563 | 2/1971 | Trotter et al. | 411/999 X |
| 3,912,411 | 10/1975 | Moffat | 411/552 X |
| 4,387,497 | 6/1983 | Gulistan | 411/107 X |
| 4,915,557 | 4/1990 | Stafford | 411/353 X |
| 4,952,107 | 8/1990 | Dupree | 411/107 X |
| 5,094,579 | 3/1992 | Johnson | 411/108 X |

OTHER PUBLICATIONS

Penn Engineering & Manufacturing Corp., "Snap-Top Standoffs", Pem Bulletin SSA-988, (Danboro, Pa.).
Penn Engineering & Manufacturing Corp., "Fasteners For Use In Or With PC Boards", Pem Bulletin K-488 (Danboro, Pa.).
Camloc Fasteners "Captive Screws", Catalog No. 3800, pp. 1-12 (Hasbrouck Heights, N.J.).
Accurate Screw Machine Co. Catalog, p. 19, (Nutley, N.J.).
Microplastics, Inc., Standard Parts Catalog, pp. 1-16, (Flippin, Ark.).
Microplastics, Inc., Microplastics Brochure, "Polycarbonate Fasteners" (Flippin, Ark.).
Southco, Inc., Southco Fasteners Handbook 43, pp. C1-C11, C18-C27, (Pennsylvania. 1993).

Primary Examiner—Neill R. Wilson
Attorney, Agent, or Firm—Paul & Paul

[57] ABSTRACT

A fully retractable captive screw that is low profile, having a snap-in feature allowing for installation of the device into a hole on a panel, by hand, without the need for separate tools. The fully retractable captive screw has a screw, a knob with a screwdriver recess on top, a cylindrical ferrule with attached snap-in mechanism, and a spring that causes the screw to retract into the ferrule when the screw is not engaged.

9 Claims, 2 Drawing Sheets

FULLY RETRACTABLE CAPTIVE SCREW

BACKGROUND OF THE INVENTION

This invention relates to captive screws of the type generally used to attach an upper panel to a lower panel or frame wherein it is desired to keep the fastener in position without loose items of hardware. The captive screw is mounted on the upper panel, such that the screw stays attached to the panel even when the threads of the screw shaft are fully disengaged from a second panel to which the upper panel is attached.

The present invention is directed toward a new and improved captive screw which is fully retractable, has a low profile, and has a hand snap-in capability requiring no tools for installation. Full retractability, in the case of a captive screw, means that the upper panel to which the captive screw itself attaches, and the lower panel against which this panel is to be attached by the screw threads, can be essentially flush against each other prior to the tightening down of the screw. That is, the end of the screw, when the captive screw is disengaged from the lower panel, does not protrude, or protrudes a minimal amount, beyond the thickness of the upper panel. Of existing captive screws, none is fully retractable, has easy hand snap-in capability requiring no tools, and has the low profile design provided by a barbed-type snap-in mechanism.

Prior captive screws that have barbed-type snap-in capability are not fully retractable. Full retractability is an important feature for many captive screw applications. Full retractability allows for the threads of a captive screw attached to an upper panel to be fully disengaged from the threaded hole of a lower panel while the upper and lower panel are in full contact. That is, the screw threads of the captive screw extend beyond the lower surface of the upper panel when the captive screw is fully disengaged. Without full retractability, a problem known as "jack-out" may occur. Jack-out occurs where a captive screw that is not fully retractable is disengaged while one or more other fasteners attaching an upper panel to a lower panel are fully engaged.

For example, jack-out occurs where a panel, such as a printed circuit board assembly, has four captive screws that are not fully retractable located four corners of the board. When one of the captive screws is disengaged while the other three corners of the board are rigidly fixed down by the remaining captive screws, the corner of the printed circuit board will rise when the screw thread no longer retracts. Flexing of the board (or, if the board is very stiff, undue pressure or deflection of the captive screw itself) will occur. This can be particularly damaging in the case of a printed circuit board. Undue flexure of a printed circuit board assembly can break solder joints, crack and destroy electronic devices, and damage the printed circuit board itself.

Additionally, a fast and inexpensive method of installation of the captive screw is an important requirement. Prior captive screws with both a low and profile and full retractability do not have a means allowing for snap-in installation. This is important in several regards. Snap-in capability increases installation speed thus reducing costs associated with assembling articles using captives screws since no tools are involved. Additionally, installation of the captive screw may be accomplished at any stage of assembly of an article. For example, if the captive screw is placed on a door panel, the captive screw of the invention at hand accommodates installation after the door panel is hung. Installation at this stage of assembly is inefficient or difficult if a press or other tool is required.

Prior fully retractable captive screws with a low profile have material-specific designs, such as those made exclusively for installation on a sheet metal panel or exclusively for installation on a plastic panel, and/or require a special tool to install. A low profile is desirable in many situations where a captive screw is used. For example, if captive screws are to be installed on a printed circuit board with entirely low profile electronic devices, it is likely that the highest point on the board is the captive screw. A lower profile will allow for reduced clearance above the board, allowing for smaller mechanical assemblies.

SUMMARY OF THE INVENTION

This invention relates to a low profile, snap-in, fully retractable captive screw of the type wherein an upper panel or other thin, flat surface is to be mounted against another surface such as a lower panel or frame. In operation, the panels are brought together with the bottom surface of the upper panel flush with the top surface of the lower panel. Mounted upon the top surface of the upper panel is a fully retractable captive screw, mounted such that, when fully retracted, the screw thread generally does not protrude beyond the bottom surface of the upper panel. The fully retractable captive screw is then engaged in a similar manner as other captive screws in the art.

To install the fully retractable captive screw, the upper panel is prepared by the drilling or punching of a hole of a selected diameter. A counterbore may be drilled or a dimple may be formed on the bottom side of the upper panel, to account for the height of the barb on the captive screw and screw protrusion beyond the barb, if any, to allow the panel to sit totally flush with a second lower panel to which the upper panel will be attached. Alternatively, allowance for the height of the barb or screw protrusion may be accomplished by a recess or dimple in the lower panel (see FIG. 6). The barb end of a snap-in, fully retractable screw is then inserted up against the hole, pressure is applied to the knob end of the captive screw in a longitudinal direction whereupon it is snapped into place using finger pressure. No tool is required for the installation of the captive screw in the hole. The upper panel may then be aligned to mate with a lower panel. The threads of the fully retractable captive screw may then be engaged with the threaded hole in lower panel and the screw is rotated until the panels are fastened tight to one another.

Prior captive screws having a barb-type snap in feature require considerably more pressure to insert. The invention at hand provides a longer slot length than other barb-type snap-in devices as used on captive screws, allowing for greater deflection of the individual barbs. A unique ferrule design allows for the longer slot length of the present invention. In the present invention, the slot lengths are longer because the ferrule containing the barbed-type snap-in means extends above the surface of the upper panel. The slots are open at the barbed-end of the ferrule and extend through the segment of the ferrule that accommodates the panel when the panel is installed. The slots continue to extend partially through a second segment of the ferrule that extends above the surface of the upper panel The unique ferrule design of the invention at hand accommodates longer snap-in slots that are not limited by the upper panel thickness. Prior snap-in style captive screw designs have slot lengths that are limited by the thickness of upper panel material onto which the captive screw is to be inserted. In prior designs, the thinner the upper panel material, the shorter the slots, and the greater the insertion force required. Since a thinner material is weaker structurally compared to a thicker material of the same substance, the requirement for more insertion force for a thinner material may cause fracturing or other effects of stress and strain on the panel material in the area of the insertion hole. For a selected screw size, the insertion force of the invention at hand does not increase as panel thickness decreases. In some substances where captive screw installation is desired, low insertion force of the captive screw may be required so as to cause no structural damage to the panel.

Finally, the invention at hand allows for a lower profile design than prior snap-in, fully retractable captive screws. The spring elements of the snap-in means in the present design extend from approximately the lower surface of the panel, through the panel, and continue above the upper surface of the panel. The spring elements of the snap-in means of prior snap-in, fully retractable captive screws are located entirely above the upper panel surface, yielding a significantly higher profile.

DESCRIPTION OF THE PREFERRED EMBODIMENT

Figure 1:
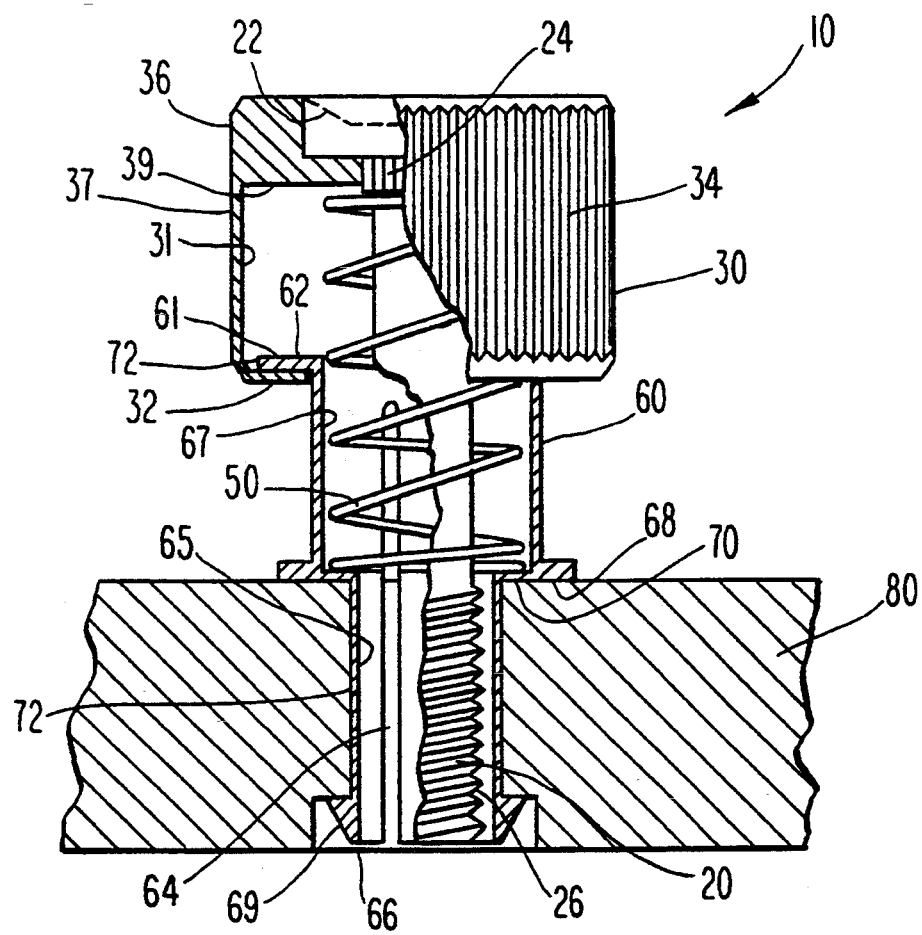
FIG. 1 is a side elevation view, partially cut away, of a snap-in, fully retractable captive screw embodying the present invention.
Figure 6:
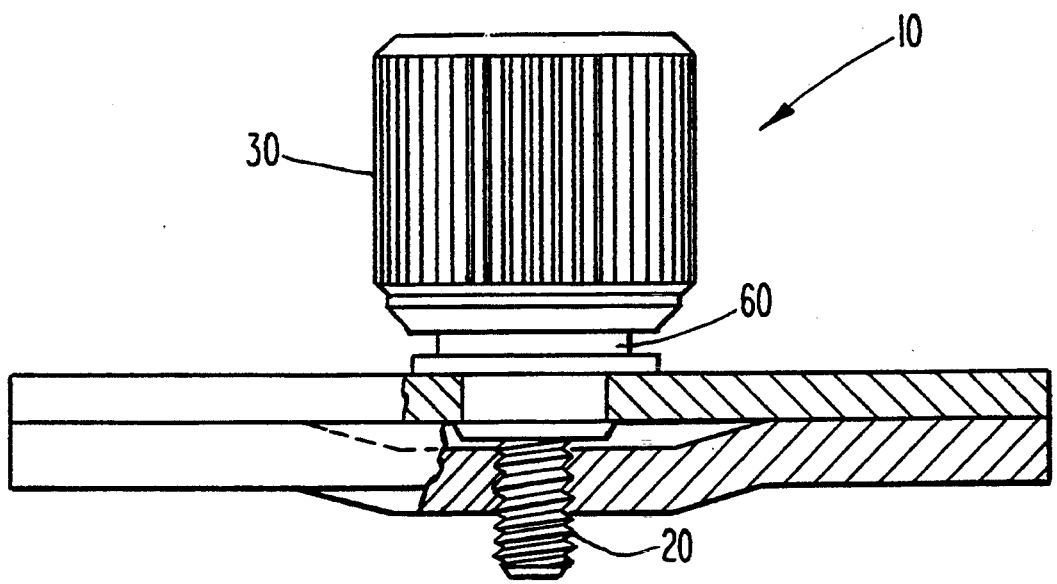
FIG. 6 is a side elevation view of a snap-in, fully retractable captive screw embodying the present invention installed in an alternate dimple configuration.

Referring now in detail to the drawings, wherein like reference numerals indicate like elements throughout the several views, there is shown in FIG. 1 a snap-in, fully retractable captive screw 10 in accordance with one preferred embodiment of the present invention. The illustrative device is shown generally comprising a screw or threaded shaft 20, a generally cylindrical, partially hollow knob 30, a spring 50 or other biasing means, a generally cylindrical, hollow ferrule 60 with snap-in means 72, and a screw captivation means 61. The illustrative device is shown installed on an upper panel 80.

Figure 2:
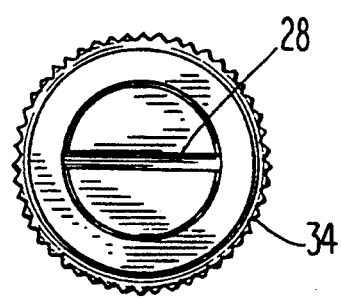
FIG. 2 is an top plan view of a snap-in, fully retractable captive screw with a preferred slotted head with ridged axial lines on the knob embodying the present invention installed in a counterbore configuration.
Figure 4:
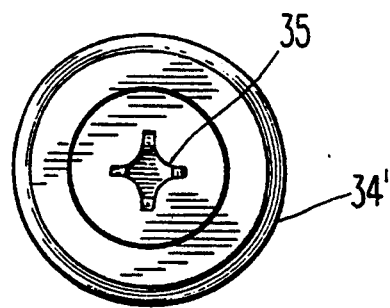
FIG. 4 is an top plan view of a snap-in, fully retractable captive screw with an alternate Phillips head and smooth knob embodying the present invention.
Figure 3:
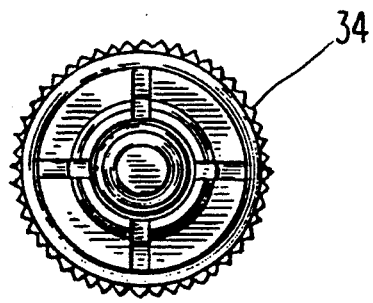
FIG. 3 is a bottom view of a snap-in, fully retractable captive screw with a ridged axial lines on the knob embodying the present invention.
Figure 5:
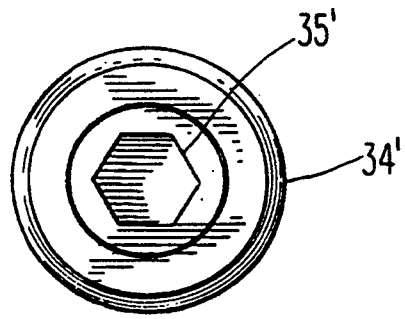
FIG. 5 is a top plan view of a snap-in, fully retractable captive screw with an alternate socket head and smooth knob embodying the present invention.

The generally cylindrical, partially hollow knob 30 has a hollow cylindrical body 37 with an end cap 36. Threaded shaft 20 is rigidly attached to the end cap 36 such that the threaded shaft 20 extends through the hollow cylindrical body 37 of the knob 30. Attachment of the shaft may be accomplished, for example, by means of a splined segment 24 of the threaded shaft 20 that facilitates the pressing in of the hollow knob 30, forming a rigid union of knob 30 and screw head 22. Additionally, integral to the threaded shaft 20 is a driving recess, preferably a recessed slot 28 (see FIG. 2), for use with a slotted-type screwdriver. As shown in FIGS. 4 and 5, alternate embodiments may include a Phillips-type recess 35 for use with a Phillips-type screwdriver, or a socket recess 35' for use with a socket wrench. Optionally disposed on the outer circumference of the knob 30 are axially scored lines 34 to facilitate tightening of the fully retractable captive screw 10 using only fingers without any tools, or to facilitate the initial alignment of the screw threads 26 with a threaded hole in the lower panel. Alternate embodiments may include a knurling pattern or other frictional surface (not shown) or a smooth surface 34' such as that shown in FIGS. 4 and 5.

The knob 30 is attached to the ferrule 60, however, full rotational movement of the knob with respect to the ferrule 60, and a limited amount of axial movement of the knob 30 with respect to the ferrule 60, corresponding to the screw engagement length, are provided. The limited axial movement is accomplished by a first annular flange 32 on the knob extending inward from the inner surface 31 of the hollow knob 30 towards the threaded shaft 20, in combination with a second annular flange 62, integral to the ferrule 60 extending outward from the body of the ferrule 60 at the knob end or first end of the ferrule 72. The inside surface 31 of the hollow knob 30 has a larger diameter than the outside diameter of the ferrule (second) annular flange 62 such that a portion of the ferrule 60 is slidable within the hollow cylindrical body 37 of the knob 30. When the captive screw 10 is engaged, i.e. when two panels are rigidly connected by the captive screw 10, the upper end of the ferrule 60 is fully inserted into the hollow cylindrical body 37 of the knob 30. Thus, the visible portion above the panel contains the knob and a portion of the snap-in annular flange 68 (described below). The first and second annular flanges 32 and 62 allow the knob 30 and the ferrule 60 to be a single non-detachable assembly, while allowing for axial movement of the knob 30 with respect to the ferrule 60.

Encased between the ferrule 60 and the knob 30 is a spring 50. Ferrule 60 has a two stage internal diameter: a lower internal diameter 65 and an upper internal diameter 67. The lower internal diameter 65 allows only clearance for threaded shaft 20 while the upper internal diameter 67 has an internal diameter large enough to accommodate the threaded shaft 20 with spring 50 surrounding it. The step 70 created with the two different internal diameters 65 and 67 serves to function as a termination point for one end of spring 50. The opposite end of spring 50 is terminated at the under side 39 of the end cap 36 of hollow knob 30. When the spring 50 is in its most uncompressed position, the knob 30 is at its most retracted position, i.e. the annular flanges 32 and 62 are in contact with each other. Here, the threaded shaft 20 is fully retracted such that the threaded shaft 20 is generally flush with the top or second end 66 of the ferrule 60.

The snap-in function of the fully retractable captive screw works by means of a spring barb mechanism. The second end of the ferrule 66, opposite the knob 30, contains at least two barb members 69. The design contains a corresponding number of ferrule slots 64. The slots 64 are open at the barbs 69 and extend through approximately three quarters of the length of the ferrule 60, i.e. through all of the axial length of the lower part of the ferrule with internal diameter 65, through the snap-in annular flange 68 (described below), and through approximately half the axial length of the upper part of the ferrule with internal diameter 67. For example, if the design contains four slots 64, these slots 64 divide the cylindrical ferrule 60 into four sections. Each section acts as an independent cantilever spring. The end of each cantilever spring, the ferrule 60 is shaped into a barb 69. When the fully retractable captive screw 10 is inserted into a hole in the upper panel, each of the cantilever springs of the ferrule 60 deflects radially inward until the hole in the upper panel causes the barbs 69 to deflect inward such that the barbs 69 fit through the hole. Slots 64 allow for this reduction in the outer diameter of the barbs 69. Once the entire panel moves past this point, the cantilever springs deflect or "snap" radially outward, back to approximately their original positions, capturing the panel between the barbs 69 and the snap-in annular flange 68. The snap-in annular flange 68 is located on the ferrule 60 approximately at the location of the ferrule step 70 as described above. The snap-in captive screw 10 may be manufactured in many different sizes corresponding to the thickness of the upper panel (as well as in different screw thread sizes). The location of the snap-in annular flange 68 on the ferrule corresponds to a particular range of panel thicknesses. When the captive screw has been inserted into a panel, all four barbs 69 must be simultaneously pressed radially inward to release the captive screw 10 from the panel.

To allow the fully retractable captive screw to be totally flush with the bottom surface of the panel it is mounted on, the panel may be drilled with a properly sized hole and then counterbored, on the side opposite the head of the captive screw such that the barbs do not protrude below the surface of the panel.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

I claim:

1. A captive screw for attaching an upper panel to a lower surface with a threaded hole comprising:
   a. a threaded shaft;
   b. at least one means to facilitate rotation of said threaded shaft;
   c. a partially hollow knob, rigidly disposed on an end of said threaded shaft, with an end cap;
   d. a hollow ferrule, through which said threaded shaft slides, comprising:
      a first and a second end, and
      a snap-in panel attachment means on said second end to attach said ferrule to a top side of said upper panel;
   e. a threaded shaft captivation means wherein said first end of said ferrule is slidably and rotatably attached to said knob such that when said threaded shaft is in a fully retracted position, said threaded shaft captivation means prevents said ferrule and said knob from separating; and
   f. a biasing means, extending between said ferrule and said knob, that causes said threaded shaft to be in a fully retracted position when no axial load is applied to said knob.

2. The captive screw of claim 1 wherein said means to facilitate rotation of said threaded shaft is a screwdriver recess.

3. The captive screw of claim 1 wherein said means to facilitate rotation of said threaded shaft is a knurling pattern on the outside diameter of the knob.

4. The captive screw of claim 1 wherein said ferrule is generally cylindrical and wherein said snap-in panel attachment means comprises at least two barbs disposed on said second end of said ferrule, said at least two barbs formed by a like quantity of open-ended slots disposed on said ferrule, open at said second end of said ferrule, extending axially to a point beyond an annular flange disposed on the outer surface of said ferrule, wherein said upper panel is retained between said annular flange and said barbs.

5. The captive screw of claim 1, wherein said biasing means is a helical spring.

6. The captive screw of claim 1 wherein:
   said knob comprises an end cap and a hollow, body with an inside surface and an outside surface, wherein said threaded shaft extends outward from said end cap through said hollow body of said knob;
   said ferrule is generally cylindrical and comprises a large diameter and a small diameter inside section, and a large diameter and a small diameter outside section respectively, separated by an annular surface, extending between said sections, which is parallel to said first and said second ends of said ferrule,
   said biasing means extends from said annular surface of said ferrule, through said large diameter inside section of said ferrule to said end cap of said hollow knob;

7. The captive screw of claim 6, wherein said inside diameter of said hollow knob is larger than said large outside diameter section of said ferrule, whereby when said captive screw is in a fully engaged position, said knob slides over said ferrule.

8. The captive screw of claim 1 wherein said screw captivation means enables said threaded shaft to rotate and move axially within said ferrule from a fully retracted position, wherein the end of said threaded shaft is generally at the same axial level as the second end of said ferrule, to a fully engaged position wherein said threaded shaft extends beyond said second end of said ferrule with a sufficient number of threads on said threaded shaft to engage said threaded hole in said lower surface.

9. A captive screw for attaching an upper panel to a lower surface with a threaded hole comprising:
   a. a threaded shaft;
   b. at least one means to facilitate rotation of said threaded shaft;
   c. a generally cylindrical, hollow ferrule, through which said threaded shaft slides, comprising:
      a first and a second end,
      a large diameter and a small diameter inside section, and a large diameter and a small diameter outside section respectively, separated by an annular surface, extending between said sections, which is parallel to said first and said second ends of said ferrule, a snap-in panel attachment means on said second end to attach said ferrule to a top side of said upper panel, comprising at least two barbs disposed on said second end of said ferrule, said at least two barbs formed by a like quantity of open-ended slots disposed on said ferrule, open at said second end of said ferrule, extending axially to a point beyond an annular flange disposed on the outer surface of said ferrule into said large diameter outside section of said ferrule, wherein said upper panel is retained between said annular ring and said barbs;

d. a generally cylindrical, hollow knob, rigidly disposed on an end of said threaded shaft, wherein said knob comprises an end cap and a hollow body with an inside surface and an outside surface, wherein said threaded shaft extends outward from said end cap through said hollow body of said knob, and wherein said inside diameter of said hollow knob is larger than said large outside diameter section of said ferrule, whereby when said captive screw is in a fully engaged position, said knob slides over said ferrule;

e. a threaded shaft captivation means wherein said first end of said ferrule is slidably and rotatably attached to said knob such that when said threaded shaft is in a fully retracted position, said threaded shaft captivation means prevents said ferrule and said knob from separating, wherein said threaded shaft captivation means enables said threaded shaft to rotate and move axially within said ferrule from a fully retracted position wherein the end of said threaded shaft is generally at the same axial level as the second end of said ferrule, to a fully engaged position wherein said threaded shaft extends beyond said second end with a sufficient number of threads on said threaded shaft to engage a threaded hole in said lower surface; and f. a spring, extending from said annular surface of said ferrule, through said large diameter inside section of said ferrule to said end cap of said hollow knob, that causes said threaded shaft to be in a fully retracted position when no axial load is applied to said knob.

* * * * *